Patented Oct. 10, 1922.

1,431,465

UNITED STATES PATENT OFFICE.

ERNST KLAPP, OF DRESDEN, GERMANY.

ORNAMENTAL ARTICLE OF MANUFACTURE.

No Drawing.   Application filed August 2, 1920.   Serial No. 400,829.

*To all whom it may concern:*

Be it known that I, ERNST KLAPP, a citizen of Germany, and resident of Dresden, have invented certain new and useful Improvements in an Ornamental Article of Manufacture (for which I have filed application in Germany, May 14, 1919), of which the following is a specification.

My invention relates to a process for the manufacture of materials or objects of common use from filaments of glass or so-called glass-wool. For that purpose such filaments were hitherto coated or covered with an elastic layer and then worked into fabrics. The life of such woven products was very short on account of the fragile condition of the glass filaments and accordingly the use of such products was extremely limited.

According to my invention the glass wool is placed on a suitable base, which may consist of fabric, felt, net-work, leather, pasteboard or the like, and may also be previously shaped into any desired article of use, such as a hat, a lamp-screen, decorative articles, or the like.

The glassy layer may be attached to the base by glue or any other suitable paste, which may be applied to the base in the customary manner and the glassy layer gently pressed against it prior to drying.

In order to obtain a very strong connection of the glassy layer with the base and to protect the layer against injury from without I preferably apply an outer protective layer or coating, which may consist of very fine net-work, or of a transparent material such as celluloid, mica, and the like.

Important advantages of my process over the old art are its simplicity, the fact that it renders the glassy filament suitable for practical use, as the glass filament is supported by the base, and does not depend entirely on its own stability.

In cases when the glassy layer is sufficiently retained or supported by the coating the glue or pasting means may be dispensed with.

I claim:

1. In combination, a support, a layer of glass filament or glass wool thereon, and a transparent layer exterior to the glass layer.

2. In combination, a support, an exterior layer of glass filament or glass wool thereon, and a transparent layer.

3. In combination, a flexible support, a layer of glass filament or glass wool in said support, and a flexible transparent protecting layer overlying the glass layer.

4. An ornamental article of manufacture comprising a support of any desired shape, and an external ornamental layer of glass filament or glass wool externally covering said support.

5. An ornamental structure comprising a flexible support, and an ornamental layer of glass filament or glass wool externally covering said support.

6. An ornamental structure comprising a flexible support, an ornamental layer of glass filament or glass wool thereon, and a flexible protecting layer through which the glass layer is discernible.

7. An ornamental article of manufacture comprising a support of any desired shape, an ornamental external layer of glass filament or glass wool on said support, and a protecting layer exterior to the glass layer and through which the glass layer may be seen.

In testimony whereof, I affix my signature in the presence of two witnesses.

ERNST KLAPP.

Witnesses:
 T. WILSON,
 E. OPPERMANN.